US012592857B2

(12) United States Patent
Li et al.

(10) Patent No.: US 12,592,857 B2
(45) Date of Patent: Mar. 31, 2026

(54) NETWORK SLICING ENHANCEMENT

(71) Applicant: QUALCOMM Incorporated, San Diego, CA (US)

(72) Inventors: Zhiguo Li, Beijing (CN); Nan Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 573 days.

(21) Appl. No.: 17/997,813

(22) PCT Filed: Jun. 28, 2020

(86) PCT No.: PCT/CN2020/098420
§ 371 (c)(1),
(2) Date: Nov. 2, 2022

(87) PCT Pub. No.: WO2022/000106
PCT Pub. Date: Jan. 6, 2022

(65) Prior Publication Data
US 2023/0353456 A1 Nov. 2, 2023

(51) Int. Cl.
*H04L 41/0895* (2022.01)
*H04L 41/0803* (2022.01)
*H04W 84/04* (2009.01)

(52) U.S. Cl.
CPC ...... *H04L 41/0895* (2022.05); *H04L 41/0803* (2013.01); *H04W 84/042* (2013.01)

(58) Field of Classification Search
CPC . H04L 41/0895; H04L 41/0803; H04L 41/40; H04L 41/5096; H04L 41/5051; H04W 84/042; H04W 4/50
See application file for complete search history.

(56) References Cited

U.S. PATENT DOCUMENTS

| | | | | |
|---|---|---|---|---|
| 2017/0367036 A1* | 12/2017 | Chen | ..................... | H04W 48/16 |
| 2018/0324645 A1 | 11/2018 | Park et al. | | |
| 2021/0168665 A1* | 6/2021 | Salkintzis | ............. | H04W 12/02 |

FOREIGN PATENT DOCUMENTS

| | | |
|---|---|---|
| CN | 107343306 A | 11/2017 |
| CN | 109951824 A | 6/2019 |
| CN | 110383890 A | 10/2019 |
| CN | 110768836 A | 2/2020 |
| CN | 111200859 A | 5/2020 |
| WO | 2017218849 A1 | 12/2017 |
| WO | 2019192672 A1 | 10/2019 |
| WO | 2019201457 A1 | 10/2019 |
| WO | 2021237391 A1 | 12/2021 |

OTHER PUBLICATIONS

International Search Report and Written Opinion—PCT/CN2020/098420—ISA/EPO—Mar. 18, 2021.
Supplementary European Search Report—EP20942982—Search Authority—Munich—Feb. 13, 2024.

* cited by examiner

*Primary Examiner* — Habte Mered
(74) *Attorney, Agent, or Firm* — Paul M. McAdams; Patterson + Sheridan, L.L.P.

(57) ABSTRACT

Aspects of the present disclosure relate to wireless communications, and more particularly, to network slicing enhancements with randomly generated application identifiers. For example, by handling requests of an application, a user equipment (UE) may be able to forward such requests to a network entity to receive an encoded random number token corresponding to the application to provide for improved indexing of applications on the UE.

30 Claims, 6 Drawing Sheets

```
Traffic descriptor component type identifier
Bits
8 7 6 5 4 3 2 1
0 0 0 0 0 0 0 1     Match-all type
0 0 0 0 1 0 0 0     OS Id + OS App Id type (NOTE)
0 0 0 1 0 0 0 0     IPv4 remote address type
0 0 1 0 0 0 0 1     IPv6 remote address/prefix length type
0 0 1 1 0 0 0 0     Protocol identifier/next header type
0 1 0 1 0 0 0 0     Single remote port type
0 1 0 1 0 0 0 1     Remote port range type
0 1 1 0 0 0 0 0     Security parameter index type
0 1 1 1 0 0 0 0     Type of service/traffic class type
1 0 0 0 0 0 0 0     Flow label type
1 0 0 0 0 0 0 1     Destination MAC address type
1 0 0 0 0 0 1 1     802.1Q C-TAG VID type
1 0 0 0 0 1 0 0     802.1Q S-TAG VID type
1 0 0 0 0 1 0 1     802.1Q C-TAG PCP/DEI type
1 0 0 0 0 1 1 0     802.1Q S-TAG PCP/DEI type
1 0 0 0 0 1 1 1     Ethertype type
1 0 0 0 1 0 0 0     DNN type
1 0 0 1 0 0 0 0     Connection capabilities type
1 0 0 1 0 0 0 1     Destination FQDN
1 0 1 0 0 0 0 0     OS App Id type
```

DETERMINE A NETWORK SLICING INSTANCE

404

ENCODE AN APPLICATION IDENTIFICATION (ID) FIELD WITHIN A SEQUENCE OF TRAFFIC DESCRIPTOR BITS WITH A RANDOM NUMBER CORRESPONDING TO AT LEAST ONE OF AN APPLICATION OR THE NETWORK SLICING INSTANCE

406

TRANSMIT THE SEQUENCE OF TRAFFIC DESCRIPTOR BITS TO A USER EQUIPMENT (UE)

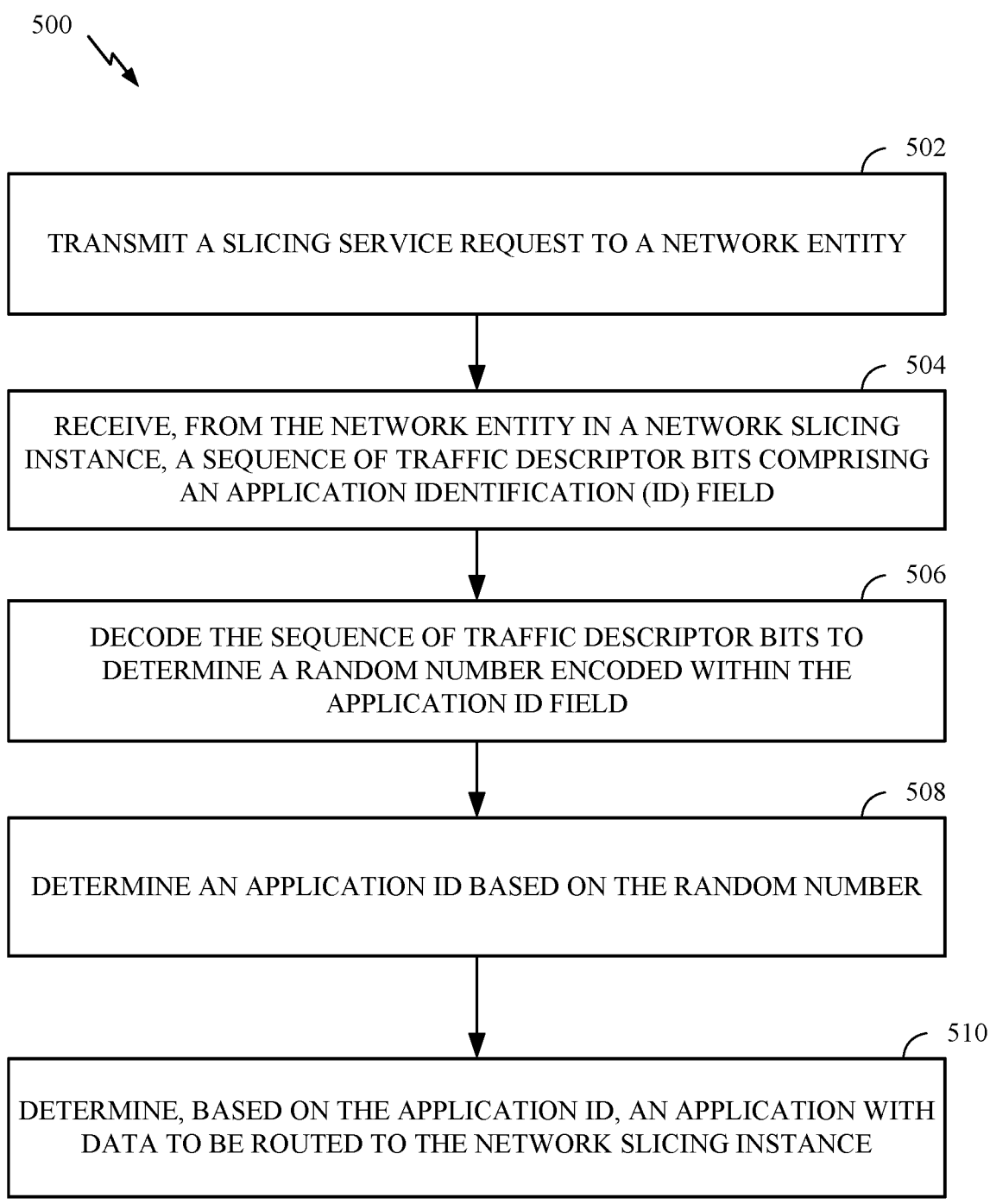

500

502

TRANSMIT A SLICING SERVICE REQUEST TO A NETWORK ENTITY

504

RECEIVE, FROM THE NETWORK ENTITY IN A NETWORK SLICING
INSTANCE, A SEQUENCE OF TRAFFIC DESCRIPTOR BITS COMPRISING
AN APPLICATION IDENTIFICATION (ID) FIELD

506

DECODE THE SEQUENCE OF TRAFFIC DESCRIPTOR BITS TO
DETERMINE A RANDOM NUMBER ENCODED WITHIN THE
APPLICATION ID FIELD

508

DETERMINE AN APPLICATION ID BASED ON THE RANDOM NUMBER

510

DETERMINE, BASED ON THE APPLICATION ID, AN APPLICATION WITH
DATA TO BE ROUTED TO THE NETWORK SLICING INSTANCE

FIG. 5

NETWORK SLICING ENHANCEMENT

CROSS-REFERENCE TO RELATED APPLICATION(S)

This Application is a national stage application under 35 U.S.C. 371 of PCT/CN2020/098420, filed Jun. 28, 2020, the entire contents of which are incorporated herein by reference.

INTRODUCTION

Field of the Disclosure

Aspects of the present disclosure relate to wireless communications, and more particularly, to network slicing enhancements.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

In some cases, wireless networks, such as NR and LTE networks, may deploy edge computing devices, so named because they reside at an "edge" of the network. Edge computing devices may support dynamic distribution of processing of data and/or content between the edge computing devices and a wireless device, such as a UE.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications a user equipment (UE) and a wireless network.

Certain aspects provide a method for wireless communications by a network entity. The method generally includes determining a network slicing instance, encoding an application identification (ID) field within a sequence of traffic descriptor bits with a random number corresponding to at least one of an application or the network slicing instance, and transmitting the sequence of traffic descriptor bits to a user equipment (UE).

Certain aspects provide a method for wireless communications by a user equipment (UE) operating system. The method generally includes transmitting a slicing service request to a network entity, receiving, from the network entity in a network slicing instance, a sequence of traffic descriptor bits comprising an application identification (ID) field, decoding the sequence of traffic descriptor bits to determine a random number encoded within the application ID field, determining an application ID based on the random number, and determining, based on the application ID, an application with data to be routed to the network slicing instance.

Certain aspects provide a network entity. The network entity generally includes a processing system configured to determine a network slicing instance and encode an application identification (ID) field within a sequence of traffic descriptor bits with a random number corresponding to at least one of an application or the network slicing instance; and a transmitter configured to transmit the sequence of traffic descriptor bits to a user equipment (UE).

Certain aspects provide a user equipment (UE). The UE generally includes a transmitter configured to transmit a slicing service request to a network entity; a receiver configured to receive, from the network entity in a network slicing instance, a sequence of traffic descriptor bits comprising an application identification (ID) field; and a processing system configured to decode the sequence of traffic descriptor bits to determine a random number encoded within the application ID field, determine an application ID based on the random number, and determine, based on the application ID, an application with data to be routed to the network slicing instance.

Certain aspects provide a network entity. The network entity generally includes means for determining a network slicing instance, means for encoding an application identification (ID) field within a sequence of traffic descriptor bits with a random number corresponding to at least one of an application or the network slicing instance, and means for transmitting the sequence of traffic descriptor bits to a user equipment (UE).

Certain aspects provide a user equipment (UE). The UE generally includes means for transmitting a slicing service request to a network entity, means for receiving, from the network entity in a network slicing instance, a sequence of traffic descriptor bits comprising an application identification (ID) field, means for decoding the sequence of traffic descriptor bits to determine a random number encoded within the application ID field, means for determining an application ID based on the random number, and means for determining, based on the application ID, an application with data to be routed to the network slicing instance.

Certain aspects provide a computer-readable medium for wireless communications by a network entity. The computer-readable medium generally includes codes executable to determine a network slicing instance, encode an application identification (ID) field within a sequence of traffic descriptor bits with a random number corresponding to at least one of an application or the network slicing instance, and transmit the sequence of traffic descriptor bits to a user equipment (UE).

Certain aspects provide a computer-readable medium for wireless communications by a user equipment (UE). The computer-readable medium generally includes codes executable to transmit a slicing service request to a network entity, receive, from the network entity in a network slicing instance, a sequence of traffic descriptor bits comprising an application identification (ID) field, decode the sequence of traffic descriptor bits to determine a random number encoded within the application ID field, determine an application ID based on the random number, and determine, based on the application ID, an application with data to be routed to the network slicing instance.

Certain aspects provide an apparatus for wireless communications by a network entity. The apparatus generally includes a processing system configured to determine a network slicing instance and encode an application identification (ID) field within a sequence of traffic descriptor bits with a random number corresponding to at least one of an application or the network slicing instance, and an interface configured to output the sequence of traffic descriptor bits for transmission to a user equipment (UE).

Certain aspects provide an apparatus for wireless communications by a user equipment. The UE generally includes an interface configured to output a slicing service request for transmission to a network entity and obtain, from the network entity in a network slicing instance, a sequence of traffic descriptor bits comprising an application identification (ID) field, and a processing system configured to decode the sequence of traffic descriptor bits to determine a random number encoded within the application ID field, determine an application ID based on the random number and determine, based on the application ID, an application with data to be routed to the network slicing instance.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 3 illustrates an example data traffic component type identifier, in accordance with certain aspects of the present disclosure.

FIG. 5 illustrates example operations for wireless communications by a UE, in accordance with some aspects of the present disclosure.

Figure 1:
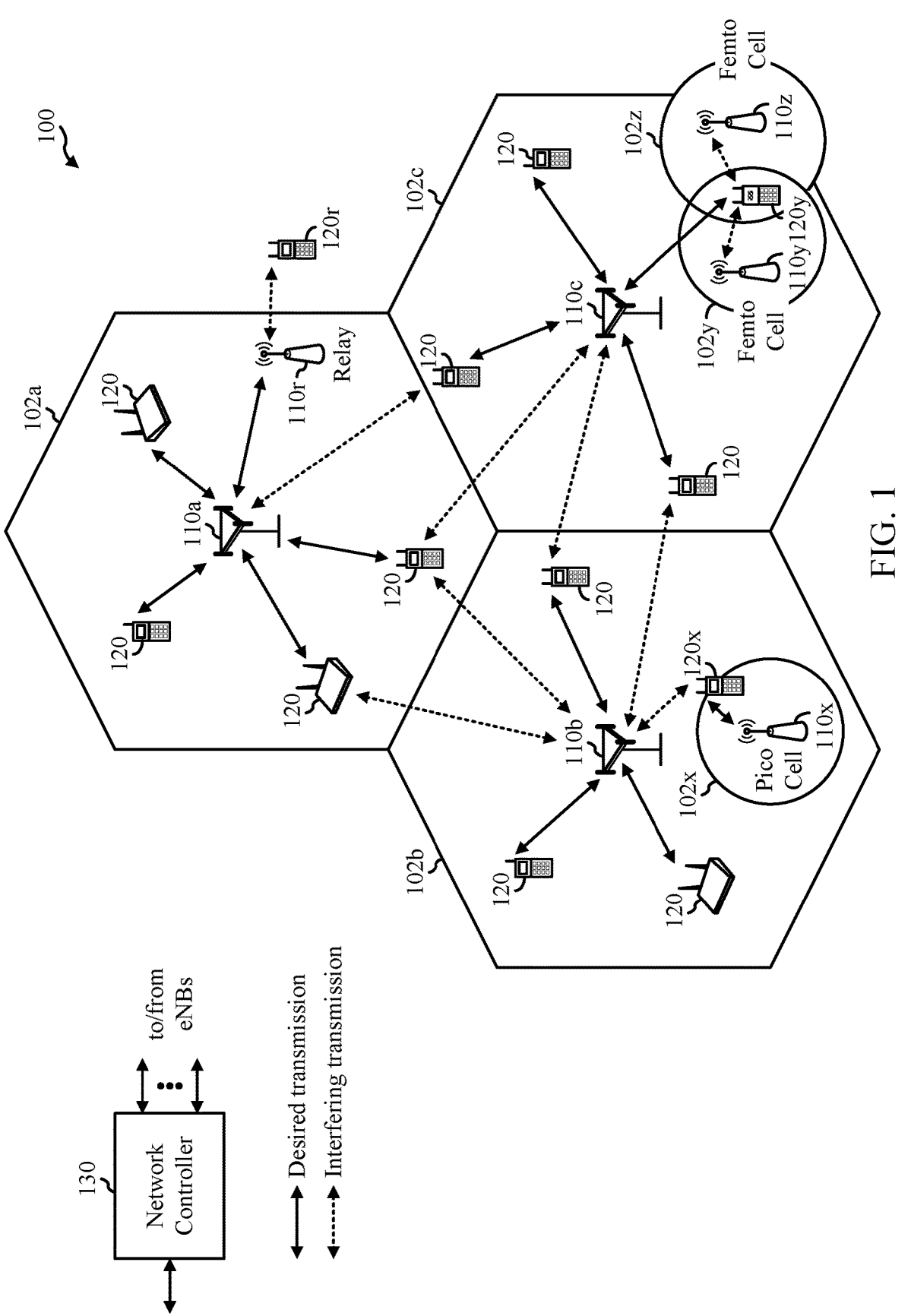
FIG. 1 is a block diagram conceptually illustrating an example telecommunications system, in accordance with certain aspects of the present disclosure.

The APPENDIX includes details of aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to network slicing enhancements with randomly generated application identifiers.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a BS 110 may be configured to perform operations 400 of FIG. 4, while a UE 120 may be configured to perform operations 500 of FIG. 5, to achieve network slicing enhancements with randomly generated application identifiers.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 shows a wireless communication network 100 in which aspects of the present disclosure may be practiced. For example, evolved Node Bs 110 may cache content and transmit the cached content to user equipments (UEs) 120 as described herein.

Wireless communication network 100 may be an LTE network. The wireless network 100 may include a number of evolved Node Bs (eNBs) 110 and other network entities. An eNB may be a station that communicates with the UEs and may also be referred to as a base station, an access point, etc. A Node B is another example of a station that communicates with the UEs.

Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.8 MHz (i.e., 6 resource blocks), and there may be 1, 2, 4, 8 or 16 subbands for system bandwidth of 1.25, 2.5, 5, 10 or 20 MHz, respectively.

The wireless network 100 may also include UEs 120 capable of communicating with a core network via one or more radio access networks (RANs) that implement one or more radio access technologies (RATs). For example, according to certain aspects provided herein, the wireless network 100 may include co-located access points (APs) and/or base stations that provide communication through a first RAN implementing a first RAT and a second RAN implementing a second RAT. According to certain aspects, the first RAN may be a wide area wireless access network (WWAN) and the second RAN may be a wireless local area network (WLAN). Examples of WWAN may include, but not be limited to, for example, radio access technologies (RATs) such as LTE, UMTS, cdma2000, GSM, and the like. Examples of WLAN may include, but not be limited to, for example, RATs such as Wi-Fi or IEEE 802.11 based technologies, and the like.

According to certain aspects provided herein, the wireless network 100 may include co-located Wi-Fi access points (APs) and femto eNBs that provide communication through Wi-Fi and cellular radio links. As used herein, the term "co-located" generally means "in close proximity to," and applies to Wi-Fi APs or femto eNBs within the same device enclosure or within separate devices that are in close proximity to each other. According to certain aspects of the present disclosure, as used herein, the term "femtoAP" may refer to a co-located Wi-Fi AP and femto eNB.

Figure 2:
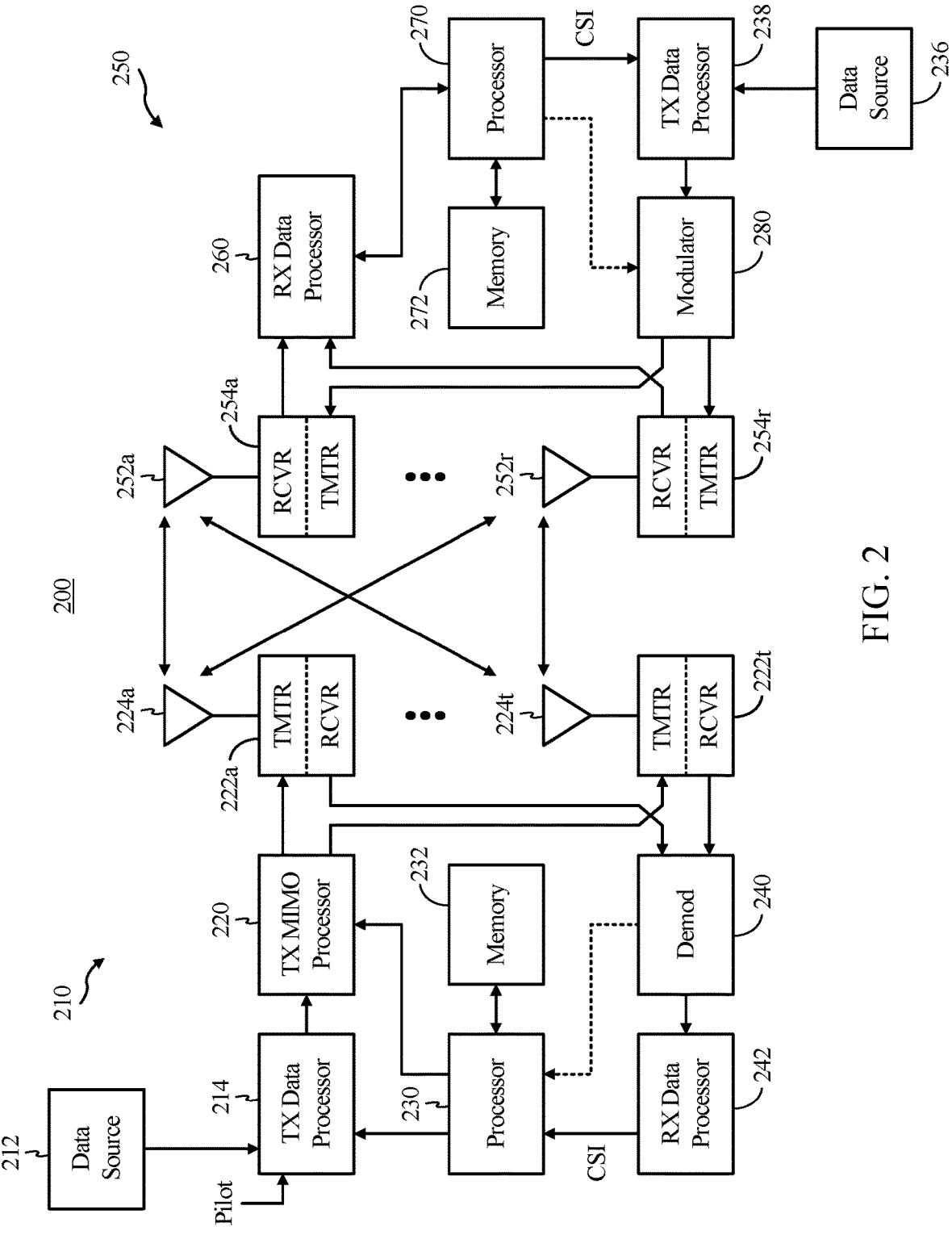
FIG. 2 is a block diagram conceptually illustrating a design of an example base station (BS) and user equipment (UE), in accordance with certain aspects of the present disclosure.

FIG. 2 is a block diagram of an example embodiment of a base station 110 (also known as an access point (AP)) and a UE 120 in which aspects of the present disclosure may be practiced. For example, the various processors of BS 110 may be configured to perform (or cause UE 120 to perform) operations 400 of FIG. 4 and/or the various processors of UE 120 may be configured to perform operations 500 of FIG. 5.

At the base station 110, traffic data for a number of data streams is provided from a data source 212 to a transmit (TX) data processor 214. In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each receiver 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At UE 120, the transmitted modulated signals are received by NR antennas 252a through 252r, and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at base station 110.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to base station 110.

At base station 110, the modulated signals from UE 120 are received by antennas 224, conditioned by receivers 222, demodulated by a demodulator 240, and processed by a RX data processor 242 to extract the reserve link message transmitted by the UE 120. Processor 230 then determines which pre-coding matrix to use for determining the beamforming weights and then processes the extracted message.

According to certain aspects, the controllers/processors 230 and 270 may direct the operation at the base station 110 and the UE 120, respectively. According to an aspect, the processor 230, TX data processor 214, and/or other processors and modules at the base station 110 may perform or direct processes for the techniques described herein. According to another aspect, the processor 270, RX data processor 260, and/or other processors and modules at the UE 120 may perform or direct processes for the techniques described herein. For example, the processor 230, TX data processor 214, and/or other processors and modules at the base station 110 may perform or direct operations 400 of FIG. 4, and/or other processors and modules at the UE 120 may perform or direct operations 500 of FIG. 5.

Example Network Slicing Enhancement

As noted above, aspects of the present disclosure relate to wireless communications, and more particularly, to network slicing enhancements with randomly generated application identifiers. For example, by handling requests of an application, a user equipment (UE) may be able to forward such requests to a network entity to receive an encoded random number token corresponding to the application to provide for improved indexing of applications on the UE.

In a conventional scenario, when applications that do not require special treatment (as identified by their application ID) request a wireless network connection, the HLOS sends an Internet Connection setup request to the modem to establish a default Internet PDU session. The requesting application, as well as other conventional applications, share this default Internet PDU session.

URSP applications, on the other hand, may require special treatment, such as special connection capabilities provided on a special network slice. In this context, a URSP application may refer to any application with data traffic that may be sent according to one or more URSP rules, for example, specifying a route selection descriptor (RSD). As such, a URSP application may not be able to share the default Internet PDU session. A network slice generally refers to a set of resources that effectively establish a logical network that runs on a shared physical infrastructure, capable of providing a negotiated service quality. The technology enabling network slicing is typically transparent to users (e.g., business customers/subscribers).

A PDU Session Establishment is the procedure allowing data transmission to a data network (DN) in a Network Slice. A PDU Session is associated with a single Network Slice Selection Assistance Information (S-NSSAI) and a data network name (DNN). A UE that is registered in a PLMN and has obtained an Allowed NS SAI, indicates in the PDU Session Establishment procedure the SNSSAI according to a Network Slice Selection Policy (NSSP) in the URSP and, if available, the DNN the PDU Session will be related.

Currently, a network slice selection policy (NSSP) traffic descriptor "OS App Id field" is a fundamental component for a UE to index application to a particular network slicing instance. As shown in FIG. 3, which is an example data traffic component type identifier, the "OS App Id Type" may be an octet of bits (as defined by current wireless standards) to provide a UE with information to search and match an application in running OS corresponding to the application ID. However, current implementations do not provide for encoding of the "OS App Id field" by UE vendors, application vendors, OS vendors, operators, and/or governments. In other words, no current solutions presently exist that provide for encoding and/or indexing multiple different applications using the "OS App Id field."

Accordingly, certain aspects provide for enhanced network slicing. For example, certain aspects provide for encoding/decoding an application identification (ID) field with a random number that corresponds to an application and/or a network slicing instance.

Figure 4:
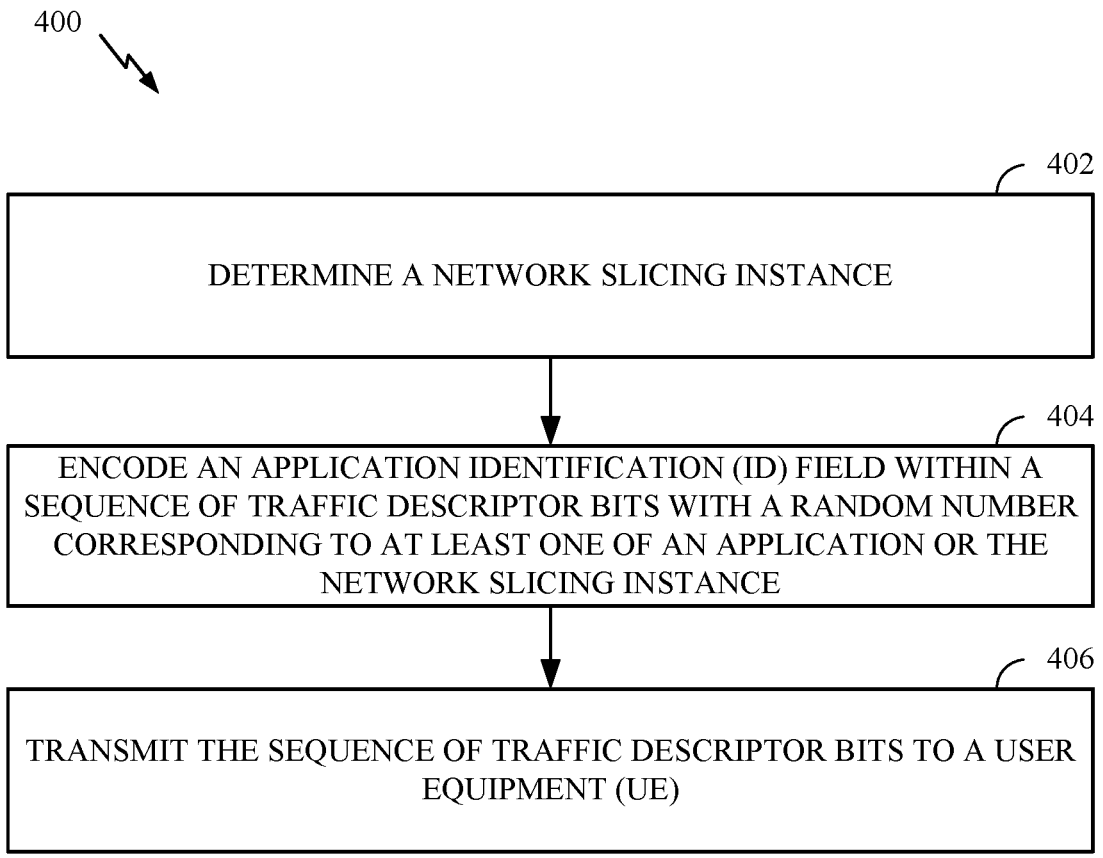
FIG. 4 illustrates example operations for wireless communications by a network entity, in accordance with some aspects of the present disclosure.

FIG. 4 illustrates example operations 400 for wireless communications by a network entity. For example, operations 400 may be performed, by a network entity (e.g., such as a BS 110 in the wireless communication network 100 of FIG. 1 or FIG. 2) to enhance network slicing.

Operations 400 begin at 402, by determining a network slicing instance. At 404, the network entity encodes an application identification (ID) field within a sequence of traffic descriptor bits with a random number corresponding to at least one of an application or the network slicing instance. At 406, the network entity transmits the sequence of traffic descriptor bits to a UE.

FIG. 5 illustrates example operations 500 for wireless communications by UE that may be considered complementary to operations 400 of FIG. 4. For example, operations 500 may be performed by a UE (e.g., the UE 120 of FIG. 1 or FIG. 2) to participate in enhanced network slicing with a network entity (e.g., a BS 110 performing operations 400 of FIG. 4).

Operations 500 begin, at 502, by transmitting a slicing service request to a network entity. At 504, the UE receives, from the network entity in a network slicing instance, a sequence of traffic descriptor bits comprising an application ID field. At 506, the UE decodes the sequence of traffic descriptor bits to determine a random number encoded within the application ID field. At 508, the UE determines an application ID based on the random number. At 510, the UE determines, based on the application ID, an application with data to be routed to the network slicing instance.

Figure 6:
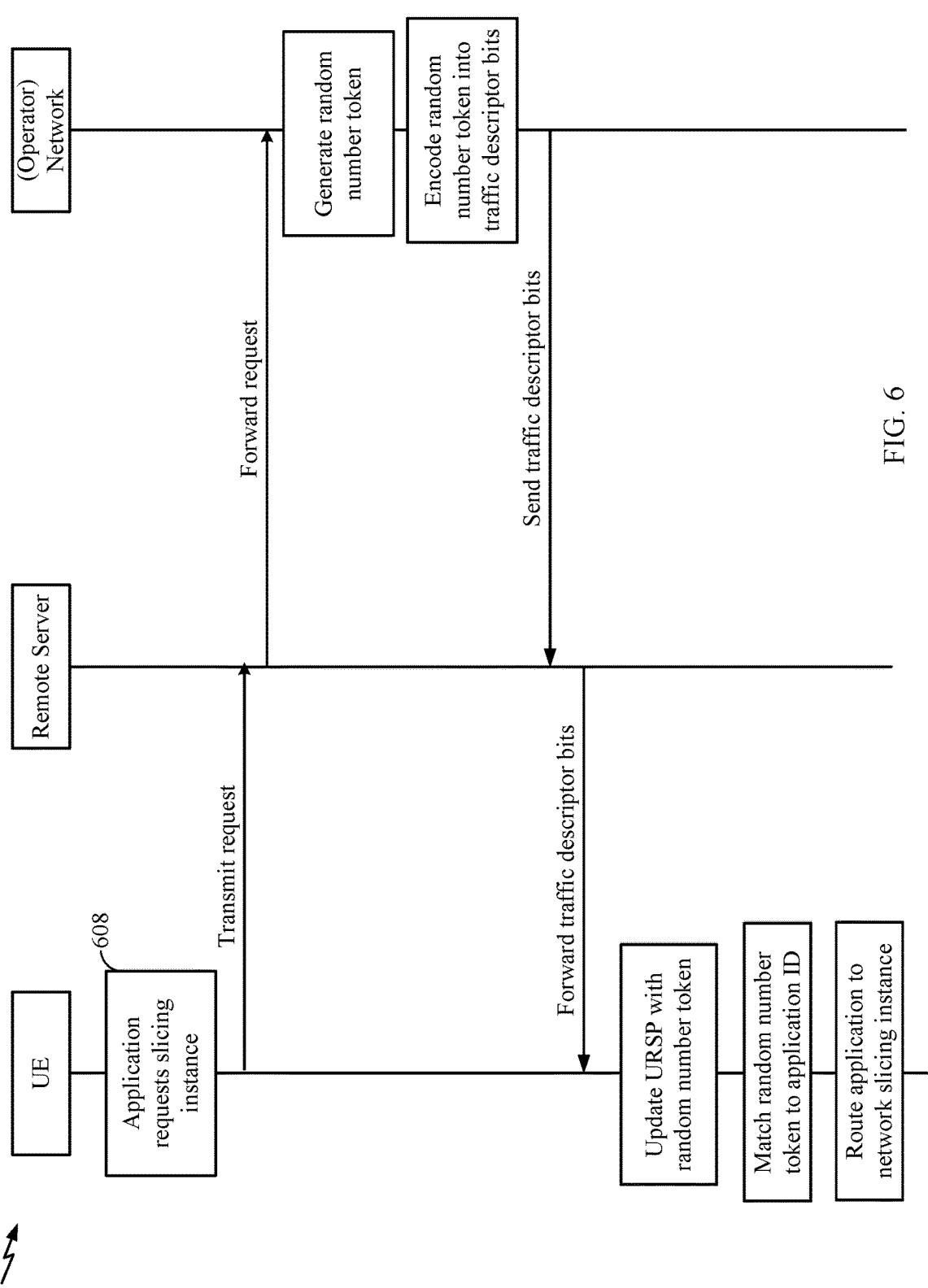
FIG. 6 illustrates an example call flow diagram for network slicing enhancement, in accordance with some aspects of the present disclosure.

The operations shown in FIGS. 4 and 5 may be understood with reference to the call flow diagram 600 of FIG. 6. In other words, a network entity (e.g., a base station of the operator network) shown in FIG. 6 may perform operations 400 of FIG. 4, while the UE may perform operations 500 of FIG. 5.

As illustrated, the UE may determine that an application has requested a slicing instance. For example, an application on the UE may indicate that the application desires an ultra-reliable low latency connection (uRLLC) network slicing service.

The UE may transmit the request to a remote server (e.g., operated by a vendor for the requesting application), and the remote server may forward the request to the network (operator). In some cases, the request received by the network may include public land mobile network (PLMN) information and/or information regarding the application. In certain aspects, the request may be transmitted via a default data service (DDS) of the UE.

As illustrated, the network (operator) may generate a random number token (e.g., a hexadecimal random number). The network may encode, with a sequence of traffic descriptor bits, an application ID field related to the application with the randomly generated number. The network may the transmit the sequence of traffic descriptor bits to the remote server, which may forward the sequence of traffic descriptor bits to the UE at 618 to configure the UE to update a UE route selection policy (USRP).

As illustrated, the UE may update a USRP based on the reception of the random number token. In some cases, the application ID corresponding to the random number token is the same as the random number token "OS App Id" which is held by the application instance. For example, the UE may match the random number token to the application ID of the application. If the matching is successful, the UE may route the application to the network slicing instance (e.g., the uRLLC network slicing instance).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one" of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120a and/or processors 220, 230, 238, and/or controller/processor 240 of the BS 110a shown in FIG. 2 may be configured to perform operations 400 of FIG. 4 and operations of FIG. 5.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for determining, means for encoding, means for generating and means for decoding may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein. For example, instructions for performing the operations described herein and illustrated in FIGS. 4 and 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a network entity, comprising:

determining a network slicing instance;

encoding an application identification (ID) field within a sequence of traffic descriptor bits with a random number corresponding to at least one of an application or the network slicing instance, wherein the random number is encoded within the application ID field; and transmitting the sequence of traffic descriptor bits to a user equipment (UE).

2. The method of claim 1, further comprising:

receiving a slicing service request from the UE; and generating the random number in response to receiving the slicing service request from the UE.

3. The method of claim 2, wherein the slicing service request indicates at least one of public land mobile network (PLMN) information or information regarding the application.

4. The method of claim 2, wherein the slicing service request is received via a default data service (DDS) of the UE.

5. The method of claim 1, wherein the network slicing instance provides ultra-reliable low latency communications (uRLLC) service.

6. The method of claim 1, wherein the sequence of traffic descriptor bits configures the UE to update a UE route selection policy (USRP).

7. A method for wireless communications performed by a user equipment (UE), comprising:

transmitting a slicing service request to a network entity;

receiving, from the network entity in a network slicing instance, a sequence of traffic descriptor bits comprising an application identification (ID) field;

16 decoding the sequence of traffic descriptor bits to determine a random number encoded within the application ID field;

determining an application ID based on the random number; and determining, based on the application ID, an application with data to be routed to the network slicing instance.

8. The method of claim 7, wherein the slicing service request is transmitted based on a request from the application.

9. The method of claim 7, wherein the slicing service request indicates at least one of public land mobile network (PLMN) information or information regarding the application.

10. The method of claim 9, wherein the slicing service request is transmitted via a default data service (DDS) of the UE.

11. The method of claim 7, wherein the network slicing instance provides ultra-reliable low latency communications (uRLLC) service.

12. The method of claim 7, further comprising updating a UE route selection policy (USRP) based on the sequence of traffic descriptor bits.

13. A network entity, comprising:

a processing system configured to:

determine a network slicing instance; and encode an application identification (ID) field within a sequence of traffic descriptor bits with a random number corresponding to at least one of an application or the network slicing instance, wherein the random number is encoded within the application ID field; and a transmitter configured to transmit the sequence of traffic descriptor bits to a user equipment (UE).

14. The network entity of claim 13, further comprising:

a receiver configured to receive a slicing service request from the UE, wherein:

the processing system is further configured to generate the random number in response to receiving the slicing service request from the UE.

15. The network entity of claim 14, wherein the slicing service request indicates at least one of public land mobile network (PLMN) information or information regarding the application.

16. The network entity of claim 14, wherein the slicing service request is received via a default data service (DDS) of the UE.

17. The network entity of claim 13, wherein the network slicing instance provides ultra-reliable low latency communications (uRLLC) service.

18. The network entity of claim 13, wherein the sequence of traffic descriptor bits configures the UE to update a UE route selection policy (USRP).

19. A user equipment (UE), comprising:

a transmitter configured to transmit a slicing service request to a network entity;

a receiver configured to receive, from the network entity in a network slicing instance, a sequence of traffic descriptor bits comprising an application identification (ID) field; and a processing system configured to:

decode the sequence of traffic descriptor bits to determine a random number encoded within the application ID field;

determine an application ID based on the random number; and determine, based on the application ID, an application with data to be routed to the network slicing instance.

20. The UE of claim 19, wherein the slicing service request is transmitted based on a request from the application.

21. The UE of claim 19, wherein the slicing service request indicates at least one of public land mobile network (PLMN) information or information regarding the application.

22. The UE of claim 21, wherein the slicing service request is transmitted via a default data service (DDS) of the UE.

23. The UE of claim 19, wherein the network slicing instance provides ultra-reliable low latency communications (uRLLC) service.

24. The UE of claim 19, further comprising updating a UE route selection policy (USRP) based on the sequence of traffic descriptor bits.

25. A network entity, comprising:

means for determining a network slicing instance;

means for encoding an application identification (ID) field within a sequence of traffic descriptor bits with a random number corresponding to at least one of an application or the network slicing instance, wherein the random number is encoded within the application ID field; and means for transmitting the sequence of traffic descriptor bits to a user equipment (UE).

26. The network entity of claim 25, further comprising:

means for receiving a slicing service request from the UE; and means for generating the random number in response to receiving the slicing service request from the UE.

27. The network entity of claim 26, wherein the slicing service request indicates at least one of public land mobile network (PLMN) information or information regarding the application.

28. The network entity of claim 26, wherein the slicing service request is received via a default data service (DDS) of the UE.

29. The network entity of claim 25, wherein the network slicing instance provides ultra-reliable low latency communications (uRLLC) service.

30. The network entity of claim 25, wherein the sequence of traffic descriptor bits configures the UE to update a UE route selection policy (USRP).

* * * * *